Feb. 28, 1956 A. W. GARDES ET AL 2,736,435

FILTER ASSEMBLY

Filed Feb. 21, 1952

Inventors:
Alfred W. Gardes
Nicholas Dudchik
by Niel, Sherman, Meroni, Gross & Simpson Attys

United States Patent Office 2,736,435
Patented Feb. 28, 1956

2,736,435

FILTER ASSEMBLY

Alfred W. Gardes and Nicholas Dudchik, Lebanon, Ind., assignors to Houdaille-Hershey of Indiana, Inc., a corporation of Indiana Application February 21, 1952, Serial No. 272,828

3 Claims. (Cl. 210—183)

This invention relates to improvements in a filter assembly, and more particularly to a filter assembly highly desirable for the purification of fuel or lubricating oils for various types of engines, such for example as diesel and marine engines, both diesel and others, although the invention will have other uses and purposes as will be apparent to one skilled in the art.

In the past, filter assemblies of this general type have been used in connection with diesel and marine engines as well as with other apparatus. With the diesel and marine engines, the filters were designed to purify the lubricating oil. The filter embodied a removable cartridge containing the filter medium which was frequently a pulverized earth medium such as fuller's earth, or the like. In formerly known cartridges of this type, the cartridge was completely encased in metal, comprising a perforate metal center tube, a perforate metal outer casing, and imperforate metal caps at each end through one of which the center tube would extend. The earth filter medium was held in position merely by a fabric bag or cover, and that was all that was utilized in an endeavor to prevent migration or carry over of the pulverized earth along with the allegedly purified oil. The carry over or migrating of a very small portion of an earth filter medium would be sufficient to damage an engine considerably, if not ruin it. Formerly known cartridges of the character above described were very expensive, objectionably so, and in times of scarcity of materials, were objectionable due to the amount of metal involved.

With the foregoing in mind, it is an important object of the instant invention to provide a filter assembly embodying a removable cartridge containing a pulverized earth filter medium without a metallic covering.

Also an object of the invention is the provision of a filter assembly, having a removable cartridge with a pulverized earth medium, and with means to prevent migration or carry over of that medium included in the assembly but separate from the cartridge.

Also an object of the invention is the provision of a filter assembly so arranged as to accommodate a cartridge comprising merely a hollow cylindrical bag of fabric or the like containing a pulverized earth filter medium, the permanent structure of the assembly being provided with means to prevent migration of the earth filtering medium.

Still a further feature of the invention resides in the provision of a filter assembly accommodating a removable and replaceable cartridge containing a pulverized earth filter medium, which cartridge is of the most economical character.

It is also a feature of this invention to provide a simple and economical filter assembly accommodating what may be termed a soft or unstable cartridge, the permanent part of the assembly being arranged to hold the cartridge in proper shape during operation.

Still another object of the invention resides in the provision of a filter assembly having a novel form of cover assembly, embodying a threaded outlet nipple permanently secured to a cap portion and associated with a casing cover so that a simple application of such unitary structure results in effecting a positive seal over a filter cartridge disposed in the casing, and also seals the cover to the casing.

It is also a feature of the invention to provide a filter assembly having a removable filtering cartridge associated therewith, and wherein the cartridge is simply and expeditiously removed and replaced, and the permanent part undergoing the most wear and dirt accumulation may be removed contemporaneously with the cartridge and readily inspected while the cartridge is being replaced.

While some of the more salient features, characteristics and advantages of the instant invention have been above pointed out, others will become apparent from the following disclosures, taken in conjunction with the accompanying drawing, in which—

Figure 1:
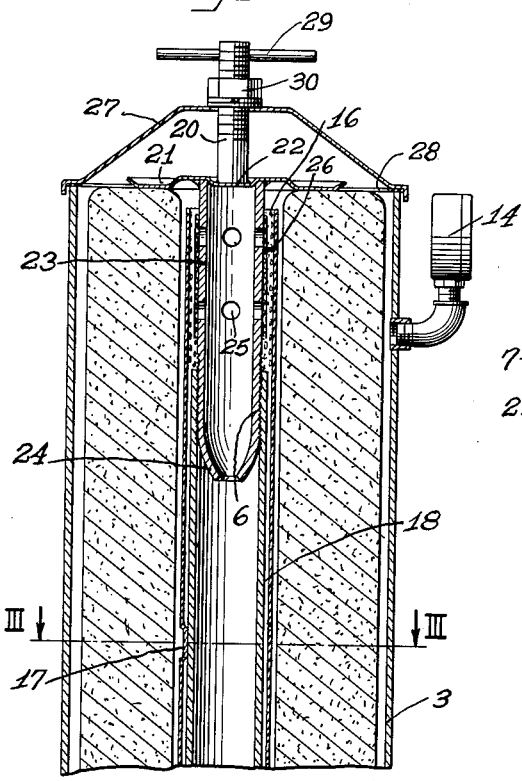
Figure 1 is a central vertical sectional view, with parts shown in elevation, of a filter assembly embodying principles of the instant invention.
Figure 2:
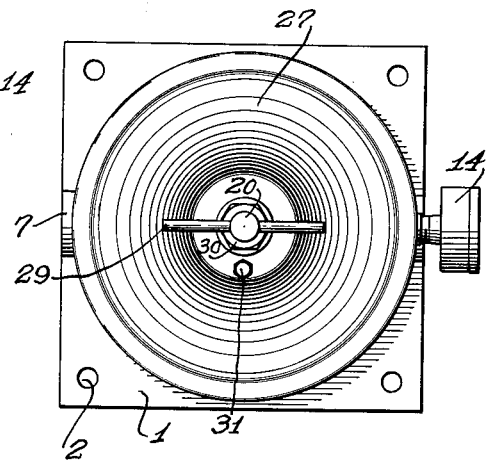
Figure 2 is a top plan view of the assembly of Fig. 1.
Figure 3:
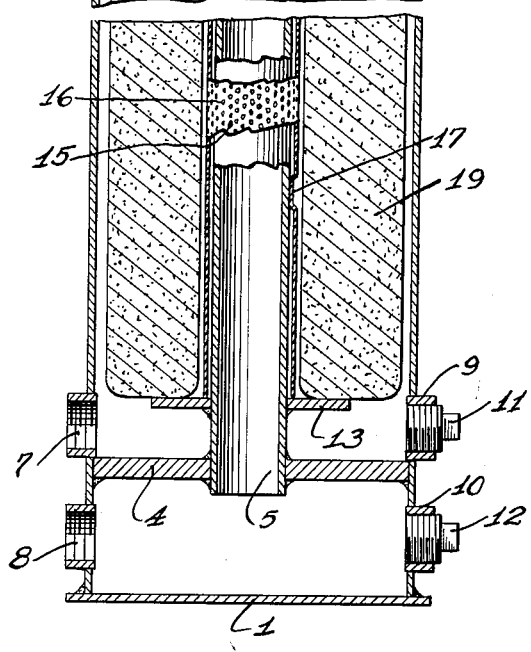
Figure 3 is a transverse plan sectional view through the intermediate portion of the structure only, taken substantially as indicated by the line III—III of Fig. 1, looking in the direction of the arrows.

In the illustrated embodiment of the instant invention there is shown a base 1, preferably square as seen in Fig. 2 so as to provide spaces for openings 2 through which bolts may extend to secure the base in position. Welded or equivalently secured to the base is an upstanding casing 3, preferably cylindrical, and which casing is closed at the bottom by the base itself, and is open at the top end. Near the lower end of the casing 3 a transverse partition 4 is welded or equivalently secured in position. This partition is centrally apertured to accommodate the lower end of an upstanding center tube 5 which functions as an outlet for filtrate, this tube being permanently secured to the partition 4. The tube 5 is imperforate throughout its length, open at both ends, but internally threaded as indicated at 6 in its upper end, and from the showing in Fig. 1 it will be noted that the tube terminates short of the upper end of the casing 3.

As seen in the lower portion of Fig. 1, an inlet 7 for liquid to be filtered is provided above the partition 4, while an outlet 8 for filtrate is provided below the partition. On the opposite side of the casing, another inlet 9 is provided together with another outlet 10, these openings being utilized when a pair of filter units or assemblies are connected in tandem, but when only one filter assembly is utilized in a single location, the inlet 9 and outlet 10 are preferably plugged as indicated at 11 and 12.

Spaced a short distance above the partition 4, is a radially extending flange 13, permanently secured to the outlet tube 5. This platform 13 is of sufficient size to support a filter cartridge in the casing.

Near the top of the casing or in any other desirable location, a pressure indicator 14 may be provided if the same is deemed necessary.

Concentric with the center outlet tube 5, but of greater diameter, is a core tube 15 provided with numerous perforations as indicated at 16. This core tube is merely loosely placed in position, seating on the aforesaid platform 13. At spaced points therealong the core tube is struck inwardly or externally notched to provide inward projections 17, so that the core tube will remain equally spaced around the center tube and a uniform fluid passage 18 is maintained between these tubes.

Around the core tube 15 a hollow cylindrical filter cartridge 19 is disposed, this cartridge being dropped through the upper open end of the casing, and resting on the aforesaid platform 13. This filter cartridge is what might be termed a soft or relatively unstable cartridge in that it comprises a fabric covering or bag containing an earth-like filter medium such as fuller's earth, diatomaceous earth, keiselghur, or the equivalent. The cartridge is maintained self-sustaining before placement in the casing 3 by means of a fiber board or plastic center tube extending through the cartridge. When the cartridge is placed in position around the core tube 15, this temporary center tube is automatically pushed out of the cartridge, and either returned to the manufacturer or cast aside. The core tube 15 thereafter maintains the cartridge out of contact with the imperforate center outlet tube 5 so that there is always a free passage 18 for filtrate adjacent the outlet tube. At the start of operation, or very shortly thereafter, the cartridge, at least in some portions, will sag into contact with the core tube 15, and in the illustrated showing of Fig. 1, the cartridge is spaced away from the core tube somewhat for purposes of clarity although this showing does not accurately depict the actual conditions.

A fabricated unit is disposed at the top of the casing, and so constructed as to provide an inlet for filtrate to the outlet tube 5, a seal over the top of the cartridge, and a cover sealed over the top of the casing. This unit embodies an upstanding threaded stud 20 to the bottom of which a flange 21 is permanently secured in an indented central portion 22. Around this central portion a pipe nipple 23 having a reduced lower end 24 is permanently secured to the underside of the flange 21. This nipple has a number of perforations 25 of relatively large size therein, and the perforated portion of the nipple is tightly covered by a fine screen 26. Migration of the pulverized earth filter medium in the cartridge 19 is prevented by this screen. That is, fine particles of the earth which might pass through the fabric covering are blocked by the screen and prevented from being carried over into the mechanism along with the filtrate. The screen is preferably made of rustproof metal, and a Dutch weave screen of a 250 mesh rating has been found satisfactory, although a finer screen may be used if so desired. The screen is welded into place around the pipe nipple 23 and is practically indestructible.

The pipe nipple is externally threaded immediately above the reduced and rounded end portion 24 for engagement with the internal thread 6 in the outlet tube 5. The reduced end 24, of course, facilitates engagement between the threads.

A dome-like cover 27, apertured to accommodate the stud 20, is provided for the casing, and the outer marginal portion of this cover is skirted to seat over a suitable gasket 28. The top end of the stud 20 is provided with an actuating rod 29, and a nut 30 therebelow may be tightened to press down the cover 27.

If so desired, an air vent 31, diagrammatically illustrated in Fig. 2, may be provided in the cover.

In operation, the instant invention is extremely simple. Assuming that the filter assembly is dismantled, it is simply necessary to drop the filter cartridge 19 in place around the core tube 15. The closing unit is then taken, and rotation of the stud 20 by the rod 29 effectively engages the nipple 23 in the upper end of the outlet tube 5, and when the nipple is tightened into position, the flange 21 effects a satisfactory fluid tight seal with the top of the cartridge 19 and no gasket at this point is necessary. After the nipple is secured, the nut 30 may be tightened down to force the cover 27 into position to effect a proper seal over the upper end of the casing 3.

Liquid to be filtered is forced under pressure through the inlet 7, and this liquid passes radially through the cartridge 19, through the perforated core tube 15, up the passage 18, through the screen 26 and perforations 25, and the filtrate descends through the outlet tube 5 and exits from the casing through the outlet 8. As stated above, the perforated core tube maintains the passage 18 open by preventing the cartridge from collapsing against the outlet tube 5. Nothing is needed on the outer side of the cartridge, because the fluid pressure prevents the cartridge from collapsing against the inside wall of the casing 3.

When a cartridge becomes undesirably contaminated, it is a simple expedient to release the nut 30, and unscrew the nipple 23, lifting the nipple, flange, and cover 27 free of the casing in a simple operation. The cartridge may then be withdrawn, and a new cartridge replaced. It will be noted that while the cartridge is being removed and replaced, the nipple and screen therearound may readily be inspected.

From the foregoing, it is apparent that I have provided a simple and highly economical form of filter assembly accommodating a soft and relatively unstable filter cartridge, and permanent parts of the assembly effectively hold this cartridge in proper position, and effectively prevent migration of a pulverized earth filter medium that might be contained in the cartridge. Removal, and replacement of the cartridge, together with inspection of salient parts of the structure is almost a single and extremely simple operation.

It will be understood that modifications and variations may be effected without departing from the scope of the novel concepts of the present invention.

We claim as our invention:

1. In a filter assembly, a casing having an outlet opening in the lower end thereof and an inlet opening spaced therefrom, an upstanding imperforate center tube having securing means on its upper end mounted in said casing over said outlet opening, a filter cartridge in said casing around said tube and extending thereabove, a hollow nipple having an open lower end and connecting means thereon for engagement with said securing means, said nipple being perforated above said connecting means, a lateral flange carried by said nipple above any perforation therein closing the top of the nipple and establishing a seal with the top of the cartridge, a member fixedly connected to said flange and nipple, means to actuate said member to effect removal and replacement of said nipple, a cover for said casing through which said member extends, and means on said member outside said cover and independently operable to clamp said cover on said casing.

2. In a filter assembly, a casing having an outlet opening for filtrate in the lower part thereof and an inlet opening spaced therefrom, a center outlet tube having an imperforate wall upstanding in said casing and communicating at its lower end with said outlet opening, a filter cartridge containing fine granular filtering material disposed around said tube, said tube having an internal threaded upper end and terminating short of the top of said cartridge, an externally threaded nipple with an open lower end and a closed upper end engaged in the upper end of said tube and extending inside said cartridge, a flange on the upper end of said nipple effecting a seal with the top of said cartridge, said nipple being perforated between said flange and the top of said tube, a screen exceeding a 200 mesh rating around the perforation in said nipple, means above said flange to actuate said nipple, and a cover for said casing.

3. In a filter assembly, a casing having an outlet opening for filtrate in the lower part thereof and an inlet opening spaced therefrom, a center outlet tube having an imperforate wall upstanding in said casing and communicating at its lower end with said outlet opening, a filter cartridge containing fine granular filtering material disposed around said tube, said tube having an internal threaded upper end and terminating short of the top of said cartridge, an externally threaded nipple with an open lower end and a closed upper end engaged in the upper end of said tube and extending inside said cartridge, a flange on the upper end of said nipple effecting a seal with the top of said cartridge, said nipple being perforated between said flange and the top of said tube, a fine screen around the perforation in said nipple, a cover for said casing, a threaded stem on said nipple extending through said cover, a nut on said stem to force said cover tightly on said casing, and other means on said stem to actuate said nipple.

References Cited in the file of this patent

UNITED STATES PATENTS

| | | |
|---|---|---|
| 1,814,572 | Shaffer | July 14, 1931 |
| 2,043,781 | Sorenson et al. | June 9, 1936 |
| 2,077,999 | Hurn | Apr. 20, 1937 |
| 2,158,512 | Layte et al. | May 16, 1939 |
| 2,271,054 | Williams | Jan. 27, 1942 |
| 2,301,121 | Kamrath | Nov. 3, 1942 |
| 2,379,582 | Kracklauer | July 3, 1945 |
| 2,429,321 | Labrecque | Oct. 21, 1947 |
| 2,432,475 | Griffith | Dec. 9, 1947 |
| 2,543,165 | Harlan | Feb. 27, 1951 |
| 2,575,995 | Briggs et al. | Nov. 20, 1951 |
| 2,601,404 | Lasky | Jan. 24, 1952 |